US012638282B2

(12) United States Patent
Mansell

(10) Patent No.: US 12,638,282 B2
(45) Date of Patent: May 26, 2026

(54) AMMUNITION SORTING DEVICE

(71) Applicant: Ryan Mansell, Temecula, CA (US)

(72) Inventor: Ryan Mansell, Temecula, CA (US)

( * ) Notice: Subject to any disclaimer, the term of this patent is extended or adjusted under 35 U.S.C. 154(b) by 84 days.

(21) Appl. No.: 18/646,350

(22) Filed: Apr. 25, 2024

(65) Prior Publication Data

US 2024/0361111 A1 Oct. 31, 2024

Related U.S. Application Data

(60) Provisional application No. 63/461,799, filed on Apr. 25, 2023.

(51) Int. Cl.
| | |
|---|---|
| *F42B 35/02* | (2006.01) |
| *B65B 35/32* | (2006.01) |
| *B65B 39/00* | (2006.01) |
| *B65G 47/24* | (2006.01) |
| *F42B 39/00* | (2006.01) |
| *F42B 39/26* | (2006.01) |

(52) U.S. Cl.
CPC .............. *F42B 35/02* (2013.01); *B65B 35/32* (2013.01); *B65B 39/00* (2013.01); *B65G 47/24* (2013.01); *F42B 39/00* (2013.01); *F42B 39/26* (2013.01)

(58) Field of Classification Search
CPC .......... F42B 35/02; F42B 39/00; F42B 39/26; B65B 35/32; B65B 39/00; B65G 47/24
See application file for complete search history.

(56) References Cited

U.S. PATENT DOCUMENTS

| | | | | |
|---|---|---|---|---|
| 2,387,672 A | * | 10/1945 | Mayherry ............. | F42B 33/002 |
| | | | | 86/47 |
| 2,466,936 A | * | 4/1949 | Dowie ............... | B65G 47/1421 |
| | | | | 198/396 |
| 2,819,575 A | * | 1/1958 | Ervine .................... | B65B 35/58 |
| | | | | 86/47 |
| 2,848,855 A | * | 8/1958 | Ervine ................. | F42B 33/002 |
| | | | | 198/374 |
| 3,404,597 A | * | 10/1968 | Holmes ................. | F42B 33/002 |
| | | | | 86/45 |
| 3,942,645 A | * | 3/1976 | Aronson ................. | A61J 3/074 |
| | | | | 209/625 |
| 5,176,289 A | * | 1/1993 | Klossner ............ | B65G 47/1421 |
| | | | | 221/168 |
| 9,038,817 B2 | * | 5/2015 | Connolly ................. | B65B 5/08 |
| | | | | 206/593 |
| 10,697,746 B2 | * | 6/2020 | Lutz ........................ | F42B 39/26 |

(Continued)

*Primary Examiner* — Mark A Deuble
(74) *Attorney, Agent, or Firm* — Dykema Gossett PLLC

(57) ABSTRACT

Various embodiments of the present disclosure include an ammunition sorting device. The ammunition sorting device can include a sorting tray. In some embodiments, the sorting tray can include a proximal sorting portion and a distal sorting portion. In some embodiments, a plurality of sorting lumens can be defined within the sorting tray. In some embodiments, each of the plurality of sorting lumens can extend between the proximal sorting portion and the distal sorting portion of the sorting tray. In some embodiments, a chute can be disposed adjacent the distal sorting portion of the sorting tray, the chute including a proximal chute portion and a distal chute portion. In some embodiments, the chute can define a plurality of chute lumens corresponding to each of the plurality of sorting lumens and extending between the proximal chute portion and the distal chute portion.

16 Claims, 13 Drawing Sheets

(56) References Cited

U.S. PATENT DOCUMENTS

| | | | | |
|---|---|---|---|---|
| 12,031,805 | B1 * | 7/2024 | Elfers ..................... | F42B 39/26 |
| 12,055,372 | B1 * | 8/2024 | Mortensen .............. | F42B 35/02 |
| 2021/0095943 | A1 * | 4/2021 | O'Reilly ................ | F42B 39/26 |
| 2023/0234099 | A1 * | 7/2023 | Hirshberg ................ | B07B 1/28 |

* cited by examiner

AMMUNITION SORTING DEVICE

CROSS-REFERENCE TO RELATED APPLICATIONS

This application claims the benefit of U.S. provisional application No. 63/461,799 (the '799 application), filed 25 Apr. 2023. The '799 application is hereby incorporated by reference in its entirety as though fully set forth herein.

BACKGROUND a. Field of the Invention

The present disclosure relates generally to an ammunition sorting device.

b. Background Art

Loose ammunition, either purchased in bulk or remanu-factured, can be stored in holding containers. Such holding containers generally can include a number of holes (e.g., 50 or 100) into which individual cartridges can be placed. However, placing the cartridges into each one of the respective holes can be a tedious and time consuming process. Furthermore, buying ammunition in bulk or remanufactur-ing (e.g., reloading) ammunition can oftentimes be associated with the purchase or remanufacture of thousands of cartridges at a time. As mentioned, placing individual cartridges into respective holes can not only be a tedious and time consuming process as a result of the sheer number of cartridges, but also a repetitive process that can lead to a repetitive strain injury.

While manufacturers of ammunition employ automated sorting machines to load cartridges into containers, such machines are complex and expensive and as such are generally not available to the end consumer. Furthermore, generally, the containers into which these types of machines generally load cartridges have a decreased storage efficiency, resultant from the holes in the containers into which the cartridges are loaded being spaced apart to allow for users to pull individual cartridges from the container. If a user wishes to remove the cartridges from the containers with decreased storage efficiency and load the cartridges into containers with decreased hole spacing, in order to increase storage efficiency, the user must individually load each cartridge into the separate container.

SUMMARY

Various embodiments of the present disclosure include an ammunition sorting device. The ammunition sorting device can include a sorting tray. In some embodiments, the sorting tray can include a proximal sorting portion and a distal sorting portion. In some embodiments, a plurality of sorting lumens can be defined within the sorting tray. In some embodiments, each of the plurality of sorting lumens can extend between the proximal sorting portion and the distal sorting portion of the sorting tray. In some embodiments, a chute can be disposed adjacent the distal sorting portion of the sorting tray, the chute including a proximal chute portion and a distal chute portion. In some embodiments, the chute can define a plurality of chute lumens corresponding to each of the plurality of sorting lumens and extending between the proximal chute portion and the distal chute portion.

Various embodiments of the present disclosure include an ammunition sorting device that can include a sorting tray, the sorting tray including a proximal sorting portion and a distal sorting portion, wherein a plurality of sorting lumens are defined within the sorting tray, and wherein each of the plurality of sorting lumens extends between the proximal sorting portion and the distal sorting portion of the sorting tray. In some embodiments, a chute can be disposed adjacent the distal sorting portion of the sorting tray, the chute including a proximal chute portion and a distal chute por-tion, wherein the chute defines a plurality of chute lumens corresponding to each of the plurality of sorting lumens and extending between the proximal chute portion and the distal chute portion. In some embodiments, a chute sleeve can be attached to the distal sorting portion of the sorting tray, wherein the chute sleeve houses the chute. In some embodi-ments, a slide separator can be disposed between the sorting tray and the chute, wherein the slide separator is configured to be protracted, thereby allowing ammunition present in the sorting tray to fall into the chute.

Various embodiments of the present disclosure include an ammunition sorting device that can include a sorting tray, the sorting tray including a proximal sorting portion and a distal sorting portion, wherein a plurality of sorting lumens are defined within the sorting tray, and wherein each of the plurality of sorting lumens extends between the proximal sorting portion and the distal sorting portion of the sorting tray. In some embodiments, a plurality of alignment projec-tions can be disposed between the plurality of sorting lumens, wherein each of the plurality of alignment projec-tions extends in a proximal direction. In some embodiments, a chute can be disposed adjacent the distal sorting portion of the sorting tray, the chute including a proximal chute portion and a distal chute portion, wherein the chute defines a plurality of chute lumens corresponding to each of the plurality of sorting lumens and extending between the proximal chute portion and the distal chute portion.

DETAILED DESCRIPTION

Figure 1A:
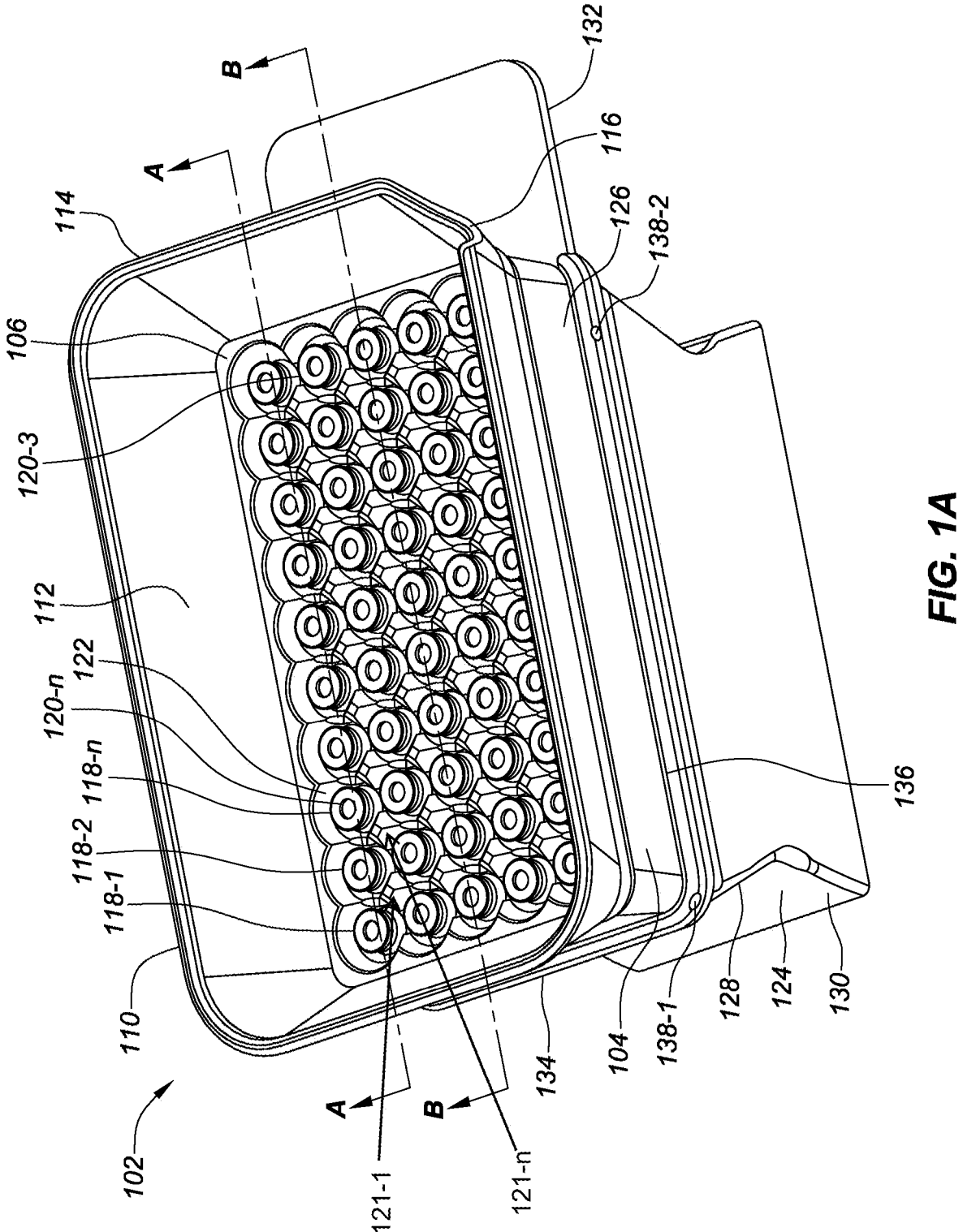
FIG. 1A is an isometric side and proximal view of an ammunition sorting device, in accordance with embodi-ments of the present disclosure.

Referring now to the drawings wherein like reference numerals are used to identify identical components in the various views, FIG. 1A is an isometric side and proximal view of an ammunition sorting device 102, in accordance with embodiments of the present disclosure. In some embodiments, the ammunition sorting device 102 can include a sorting tray 104. In some embodiments, the sorting tray 104 can include a proximal sorting portion 106 and a distal sorting portion 126, as further depicted and described in relation to FIG. 1D. Disposed proximally with respect to the sorting tray 104 is a hopper portion 110, that extends proximally from the sorting tray 104. As used herein, the term "proximal" refers to the portion of the device into which cartridges are deposited (e.g., into the hopper portion 110 and sorting tray 104). As used herein, the term "distal" refers to the portion of the device into which a container is disposed and into which cartridges are loaded.

As depicted, the hopper portion 110 can extend proximally with respect to the sorting tray 104. In some embodiments, the hopper portion 110 can extend proximally and at the same time be flared in an outward direction, such that internal walls 112 of the hopper portion are slanted in an outward direction, as they extend proximally. The hopper portion 110 can have a proximal lip 114 that extends around a proximal perimeter of the hopper portion 110. In some embodiments, a recess 116 can be defined in the proximal lip 114 of the hopper portion 110 to enable excess cartridges to be poured out of the ammunition sorting device 102. While a recess is depicted, in some embodiments, an outwardly extending lip can be formed along the perimeter of the recess 116, such that a spout is created for pouring excess ammunition out of the ammunition sorting device 102.

As depicted in FIG. 1A, and further discussed herein, the sorting tray 104 can include a plurality of sorting lumens 118-1, 118-2, . . . , 118-$n$, hereinafter referred to in the plural as sorting lumens 118. Each of the plurality of sorting lumens can extend between the proximal sorting portion and the distal sorting portion of the sorting tray. For example, the plurality of sorting lumens 118 can extend from a most proximal surface of the sorting tray 104 to a most distal surface of the sorting tray 104. In some embodiments, the plurality of sorting lumens 118 can extend from a point located distally from the most proximal surface of the sorting tray 104 to a point located proximally from the most distal surface of the sorting tray 104.

Each one of the sorting lumens 118 can be defined about a respective sorting axis extending therethrough, which can extend from a proximal to a distal end of the sorting tray. As depicted in FIG. 1A, a cartridge 120-$n$ is depicted as being inserted into each sorting lumen 118-$n$. For ease of illustration, only one cartridge 120-$n$ is labeled, however, as seen in FIG. 1A, the sorting tray is depicted with a plurality of cartridges 120-$n$. Accordingly, a longitudinal axis associated with each cartridge can be aligned with each respective sorting axis. The plurality of sorting lumens 118 can extend along parallel sorting axes in some embodiments.

In some embodiments, each of the sorting lumens can include a throat portion 122-$n$. As depicted, the throat portion 122-$n$ can be defined by a widened proximal portion of the sorting lumen 118-$n$. For example, a diameter of the throat portion 122-$n$ can be an increased diameter with respect to the diameter of the sorting lumen 118-$n$. An increased diameter of the throat portion 122-$n$ with respect to the diameter of the sorting lumen 118-$n$ can allow for a cartridge 120-$n$ to more easily enter into the throat portion 122-$n$ and thus into a respective one of the sorting lumens 118-$n$. For example, due to the nature of a cartridge 120-$n$, oftentimes, the end of the cartridge 120-$n$ into which the projectile (e.g., bullet) is inserted, is much heavier than the end of the cartridge 120-$n$ into which the primer is inserted. By providing throat portions 122-$n$ of increased diameter, the cartridge 120-$n$ can be allowed to "tip" into the throat portion 122-$n$ and enter the respective sorting lumen 118-$n$. As depicted in FIG. 1A, the throat portion also includes a pair of alignment projections 121-1, 121-$n$, which extend in a proximal direction. Further details associated with alignment projections and details associated with the throat portion are discussed herein, for example, in relation to FIGS. 3A to 4.

In some embodiments, the diameter of the throat portion 122-$n$ can increase in a proximal direction, such that the throat portion 122-$n$ is flared in the proximal direction. In some embodiments, as further discussed herein, the throat portion 122-$n$ can have a starting distal diameter the same as a respective sorting lumen 118-$n$ and can gradually increase in diameter to an ending proximal diameter.

As further depicted in FIG. 1A, the ammunition sorting device 102 can include a chute 124. The chute 124 can be disposed adjacent the bottom of sorting portion of the sorting tray 104. For example, the chute 124 can be disposed adjacent the distal sorting portion 126 of the sorting tray 104. The chute 124 can include a proximal chute portion 128 and a distal chute portion 130. As further depicted and discussed herein, the chute 124 can define a plurality of chute lumens corresponding to each of the plurality of sorting lumens 118-$n$. For example, chute lumens 150-1, 150-2, 150-$m$ can be defined within the chute 124, as further depicted in FIG. 1D. Further embodiments associated with the chute 124 are discussed herein.

In some embodiments, the chute 124 and the sorting tray 104 can be formed from separate components. For example, the chute 124 and the sorting tray 104 can be joined together, as depicted in FIG. 1A. As depicted, the proximal chute portion 128 can include a laterally extending lip 134. In some embodiments, the laterally extending lip 134 can define an opening 136, which can be approximately the same size as the most distal sorting portion 126. Accordingly, the most distal sorting portion 126 can be disposed within the opening 136. Connection of the sorting tray 104 and the chute 124 can be accomplished by a press-fit, adhesive, rivets, screws, pins, etc. As depicted in FIG. 1A, pins 138-1, 138-2 are depicted as retaining the distal sorting portion 126 within the opening 136 defined by the laterally extending lip 134.

As further depicted in FIG. 1A, the ammunition sorting device 102 can include a separator 132 disposed between the sorting tray 104 and the chute 124. In some embodiments, a most distal sorting portion 126 can be vertically spaced apart from a most proximal chute portion 128, thereby providing a space in which the separator 132 can be disposed. The separator 132 can separate the sorting lumens **118-*n*, from the chute lumens 150-1, 150-2, 150-*n* (FIG. 1D) corresponding to each of the plurality of sorting lumens 118-*n*. Thus, as cartridges fill one or more of the sorting lumens 118-*n*, the cartridges 120-*n* can be retained within the sorting tray 104 by the separator 132**.

Figure 1B:
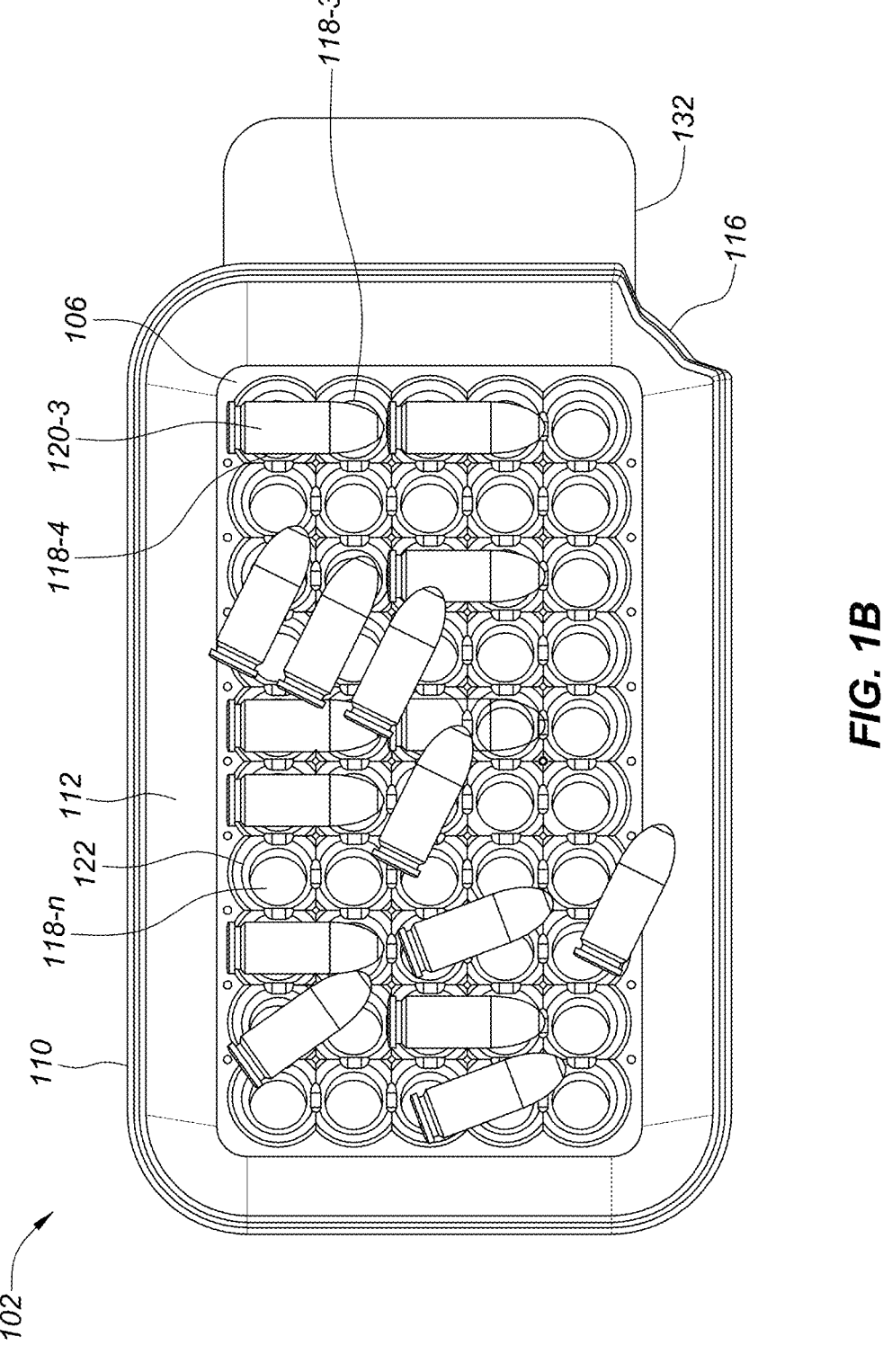
FIG. 1B is a proximal view of the ammunition sorting device depicted in FIG. 1A, in accordance with embodi-ments of the present disclosure.

With respect to loading cartridges into one or more of the sorting lumens **118-*n*, as depicted in FIG. 1B, in some embodiments, a plurality of cartridges 120-*n* can be loaded into the hopper portion 110. FIG. 1B is a proximal view of the ammunition sorting device 102 depicted in FIG. 1A, in accordance with embodiments of the present disclosure. As depicted, the cartridges 120-*n* are depicted as laying horizontally across the proximal sorting portion 106. With respect to cartridge 120-3, the cartridge is depicted as laying across two sorting lumens 118-3, 118-4. As a result of the bullet that is inserted into the cartridge 120-3, the end of the cartridge into which the bullet is inserted is much heavier than the side of the cartridge 120-3 into which the primer is inserted. Accordingly, when the cartridge 120-3 is disposed in a position across two sorting lumens 118-3, 118-4, the cartridge 120-3 has a propensity to tip towards the end of the cartridge 120-3 into which the bullet is inserted. In some embodiments, a user can grasp the ammunition sorting device 102 and move (e.g., shake) the ammunition sorting device 102 back and forth, using lateral motions. For example, a user can shake the ammunition sorting device 102 back and forth along a plane aligned with the proximal sorting portion 106. Manipulating the sorting device 102 in such a fashion can cause each one of the cartridges to become positioned such that it falls into a respective sorting lumen 118-*n*. For example, with respect to the cartridge 120-3, if the cartridge 120-3 did not naturally fall into the sorting lumen 118-3, the cartridge 120-3 would likely fall into the sorting lumen 118-3 or one of the surrounding sorting lumens, upon a user shaking the ammunition sorting device 102**.

As each one of the sorting lumens 118 becomes filled with a cartridge, other ones of the cartridges that are yet to be disposed in a sorting lumen can skip over the filled lumens until they approach an unfilled sorting lumen 118 and fall into the respective unfilled sorting lumen 118. Eventually, all of the sorting lumens 118 can be filled, as depicted in FIG. 1A. For any remaining cartridges that remain on top of the proximal sorting portion 106 and not disposed in a sorting lumen, those remaining cartridges can be poured out of the ammunition sorting device 102 via recess 116 and for example, back into a container for subsequent processing through the ammunition sorting device 102.

Figure 1C:
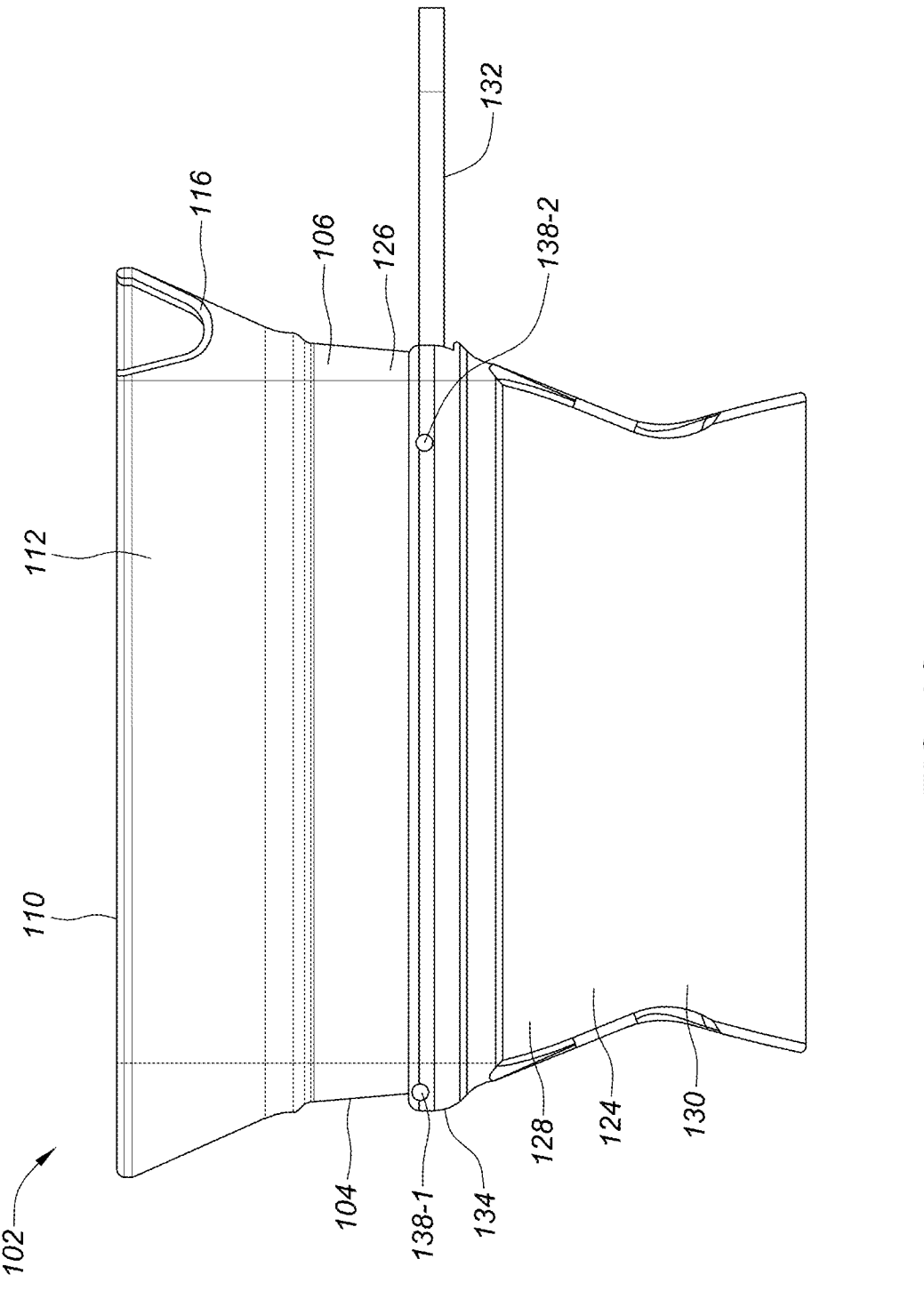
FIG. 1C is a side view of the ammunition sorting device depicted in FIG. 1A, in accordance with embodiments of the present disclosure.

FIG. 1C is a side view of the ammunition sorting device 102 depicted in FIG. 1A, in accordance with embodiments of the present disclosure. As depicted, the separator 132 is disposed between the sorting tray 104 and the chute 124. The separator 132 is depicted as being in a retracted state, such that each sorting lumen defined in the sorting tray is separated from each respective chute lumens defined in the chute 124. Further depiction of the separator 132 is provided in FIG. 1D.

Figure 1D:
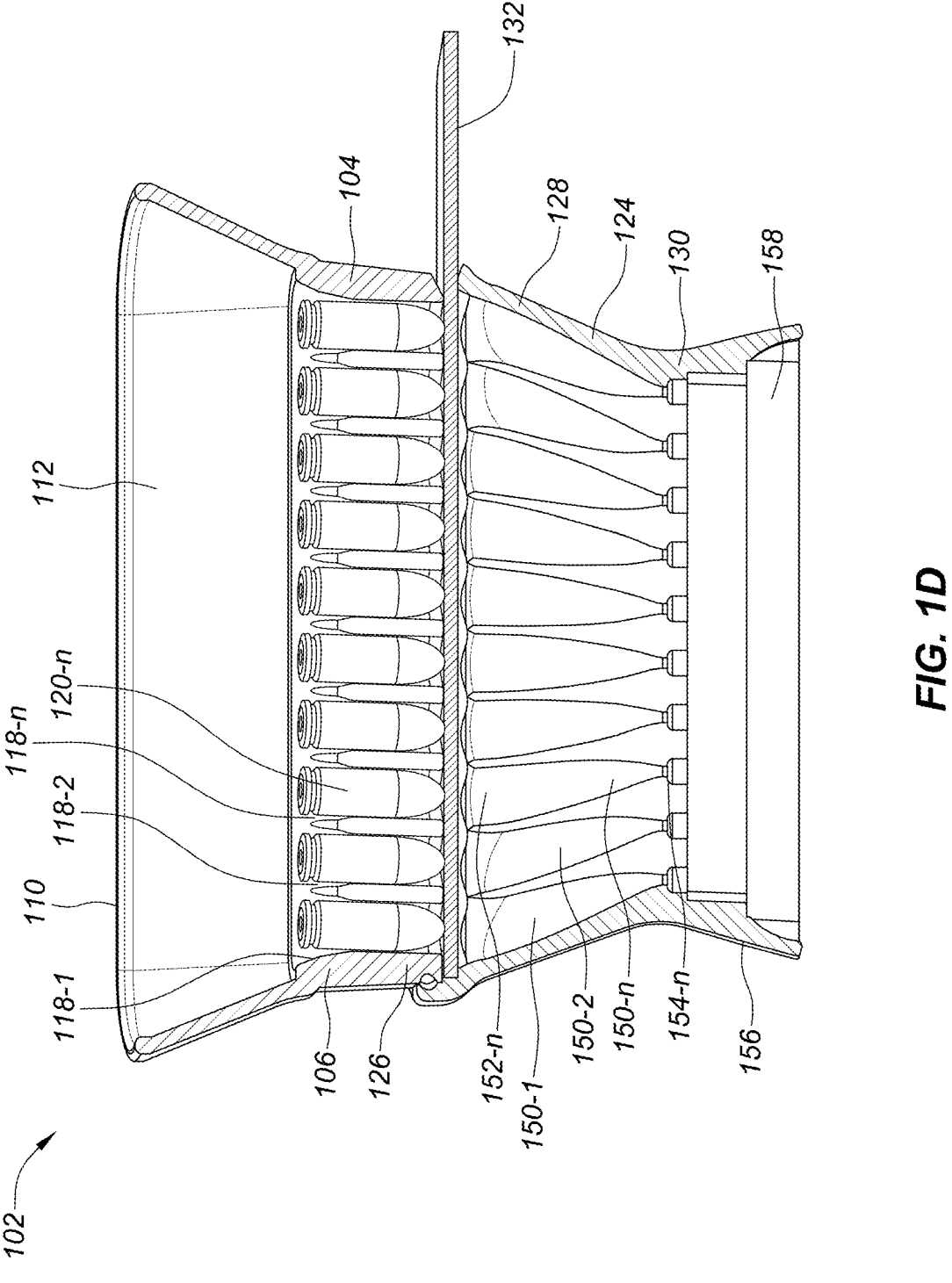
FIG. 1D is a cross-sectional view of the ammunition sorting device depicted in FIG. 1A, along line AA, in accordance with embodiments of the present disclosure.

FIG. 1D is a cross-sectional view of the ammunition sorting device 102 depicted in FIG. 1A, along line AA, in accordance with embodiments of the present disclosure. As depicted in FIG. 1D, the cartridge **120-*n* is disposed in a respective sorting lumen 118-*n*. The cartridge 120-*n* can be supported by the separator 132, thereby preventing the cartridge from dropping down into a respective chute lumen 150-*n*. As depicted, the separator 132 serves to physically block cartridges disposed in each of the sorting lumens 118 from entering into each of the respective chute lumens 150-1, 150-2, . . . , 150-*n*. Upon protraction of the separator 132, the separator can be pulled out of the ammunition sorting device 102, thereby unblocking a passageway from the sorting lumens 118-*n* to the chute lumens 150-*n* and allowing any cartridges 120-*n*, disposed in the sorting lumens 118-*n* to freefall into respective ones of the chute lumens 150-*n***.

In some embodiments, each chute lumen **150-*n* can include a throat portion 152-*n* and a distal chute portion 154-*n* and can extend along a chute axis. For example, the chute axis can extend through a center of the throat portion 152-*n* and out a center of the distal chute portion 154-*n* (e.g., through a center of the chute lumen). As depicted, a spacing between the chute lumens 150-2 can converge with respect to one another at the distal chute portion 154-*n*. For example, a spacing between each one of the chute lumens 150-*n* with respect to one another can decrease from the proximal chute portion 128 to the distal chute portion 130**. In an example, a distance between a center of each one of the chute lumens and a center of each adjacent chute lumen decreases in a direction from the proximal chute portion to the distal chute portion. In some embodiments, the plurality of chute lumens can define a plurality of converging chute axes.

In some embodiments of the present disclosure, the chute 124 can include a holder portion 156. The holder portion 156 can be disposed at a most distal portion of the chute 124, in some embodiments, and can be configured for accepting a container into which cartridges **120-*n* can be loaded. In some embodiments, the holder portion 156 can be a recessed area 158 that is configured to accept a container. The container can include a container such as that described in relation to U.S. Pat. No. 11,435,172, titled "Modular Ammunition Organization System," which is incorporated by reference as though fully set forth herein. Although not depicted, a container with approximately a same size as the recessed area 158 can be disposed within the recessed area 158. Upon protraction of the separator 132, the cartridges 120-*n*** can drop into respective holes defined within the container.

In some embodiments, convergence of the chute lumens **150-*n* can allow for a larger spacing between the sorting lumens 118-*n*, while still allowing for the cartridges to be placed into a container that has a reduced spacing between respective holes into which cartridges are loaded. In some embodiments, reduced spacing can be in relation to containers in which ammunition is packaged and sold. Spacing between a center of each one of the chute lumens 150-1, 150-2, 150-*n* in the distal chute portion 130 can be approximately 0.475 inches. In some embodiments, the chute lumens that are disposed in rows orthogonal to the row in which chute lumens 150-1, 150-2, 150-*n* are disposed can have the same or different spacing between each other as the spacing associated with the chute lumens 150-1, 150-2, 150-*n*. For clarity, if the row in which the chute lumens 150-1, 150-2, 150-*n*** are located is considered to be in the y-direction, the chute lumens that are in rows orthogonal to the y-direction can be considered to be in the x-direction.

Figure 2A:
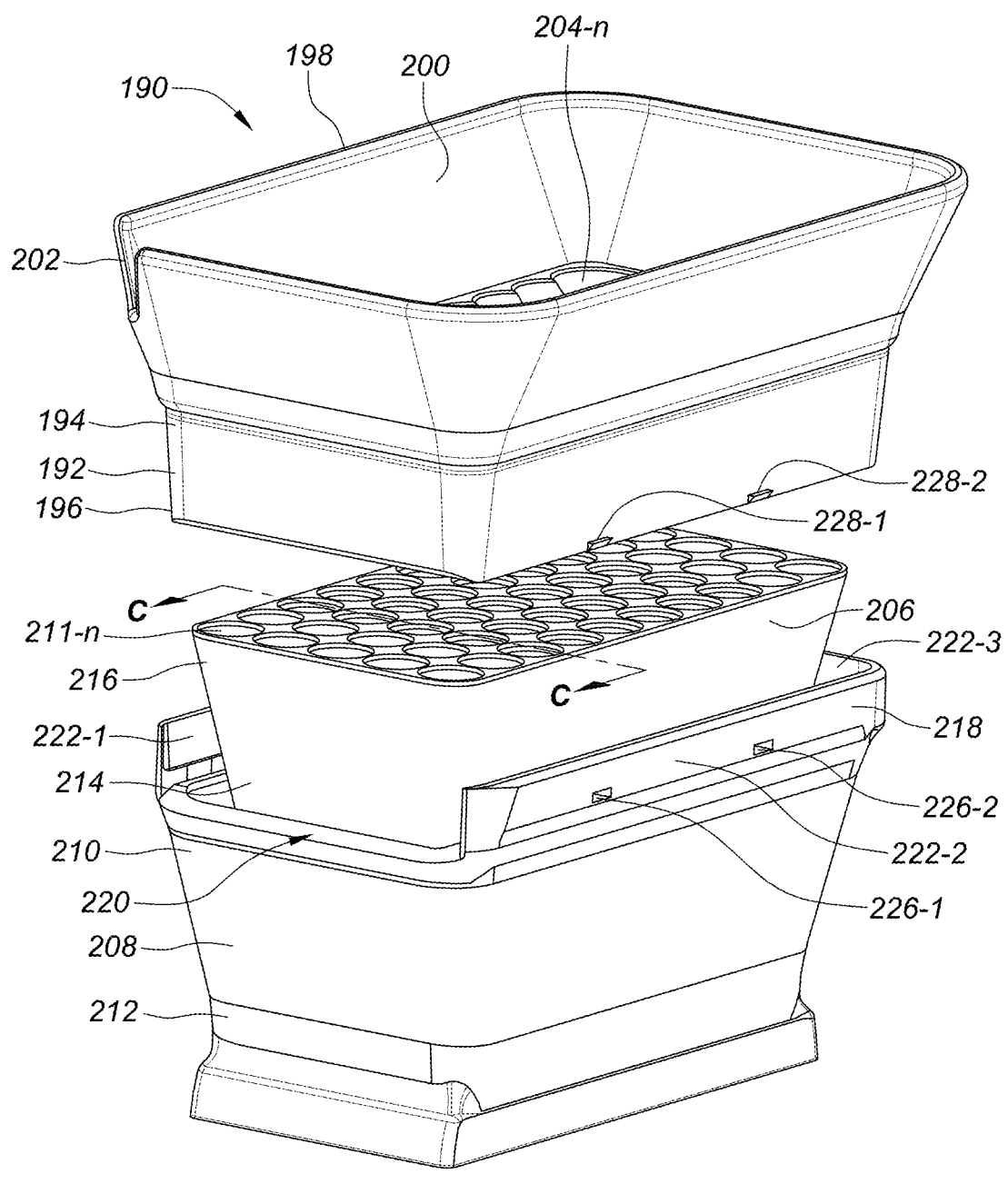
FIG. 2A depicts an exploded isometric side view of an ammunition sorting device, in accordance with embodiments of the present disclosure.
Figure 2B:
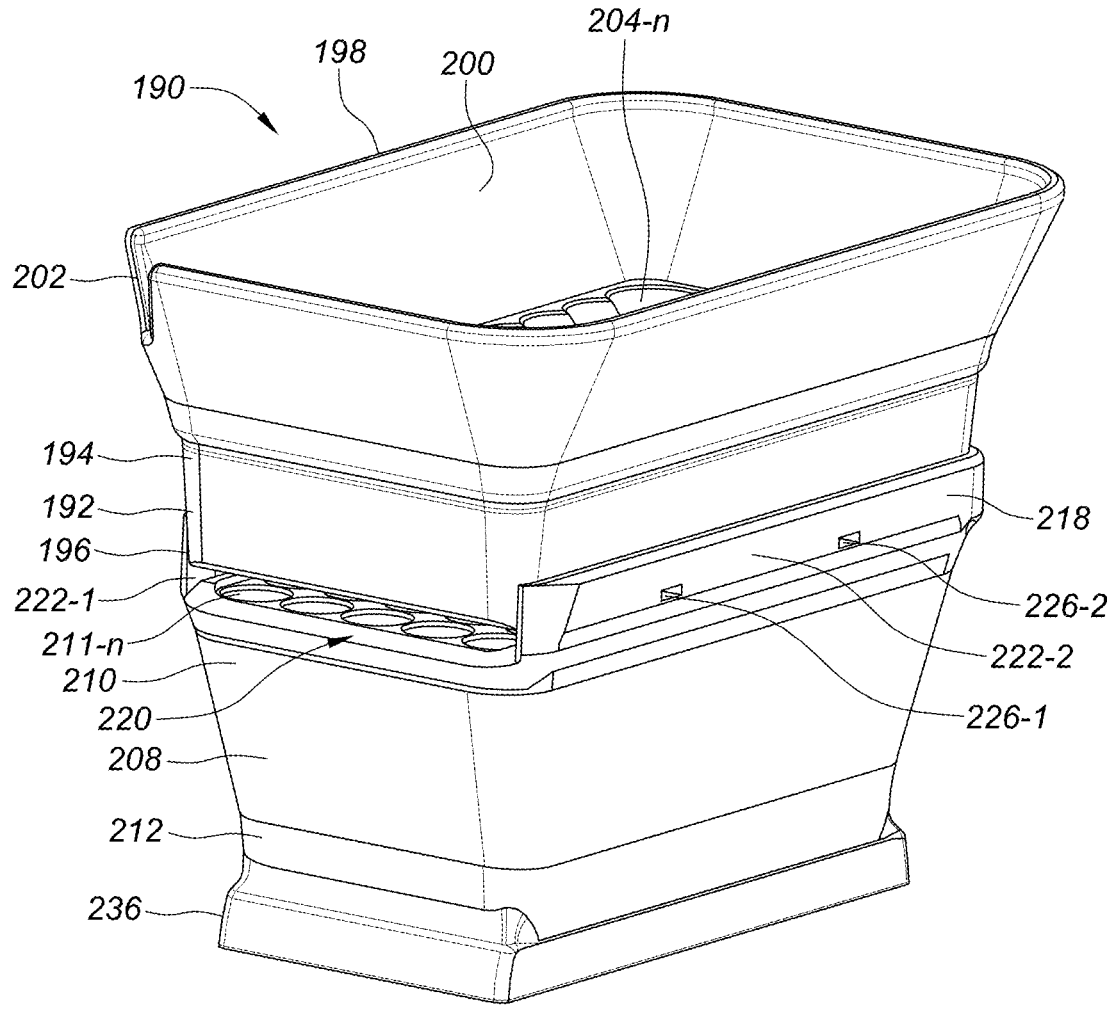
FIG. 2B depicts an assembled isometric side view of the ammunition sorting device depicted in FIG. 2A, in accordance with embodiments of the present disclosure.
Figure 2C:
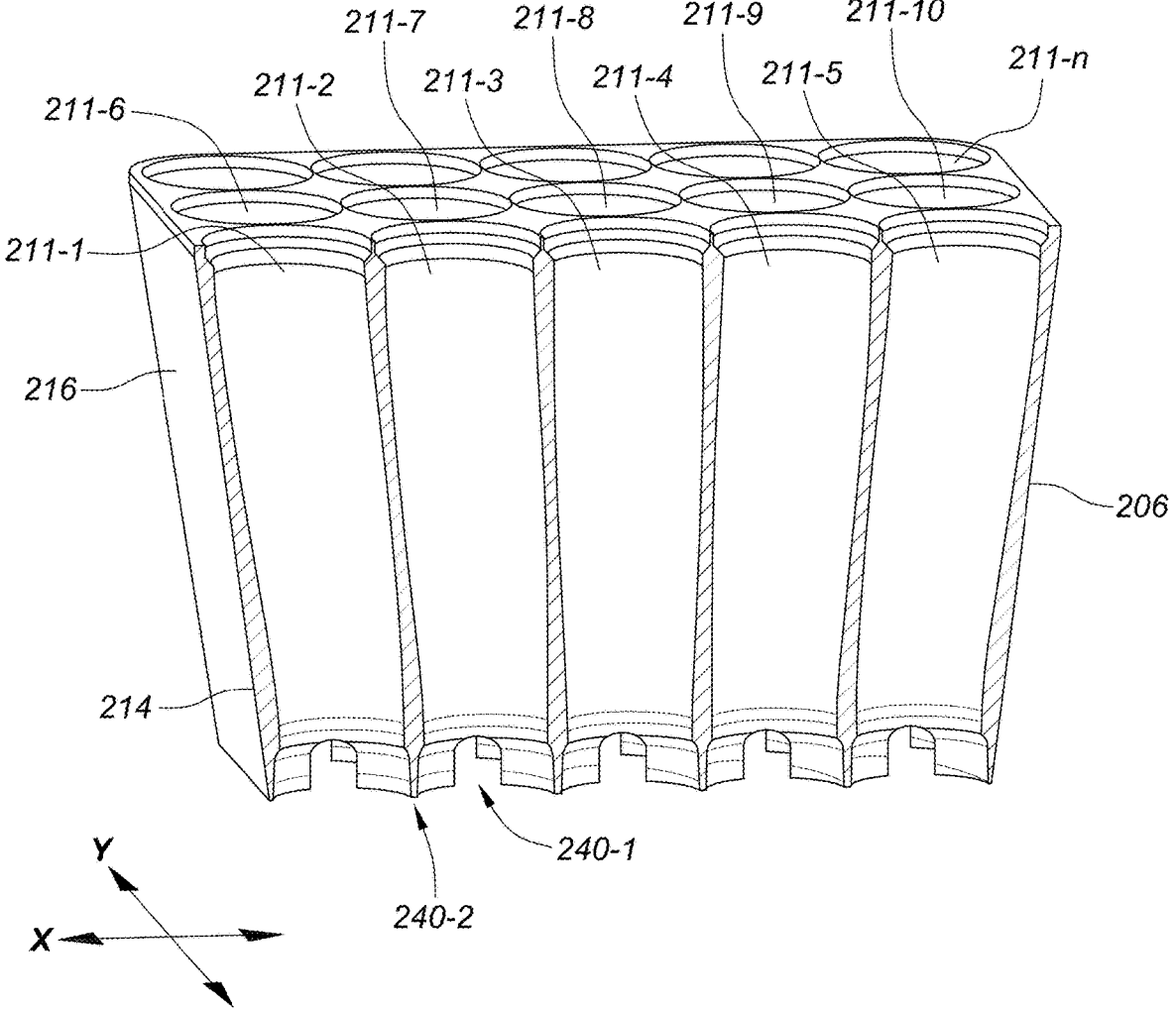
FIG. 2C depicts an isometric side and cut-away view of the chute depicted in FIG. 2A, along line CC, in accordance with embodiments of the present disclosure.

For better understanding, an x and y axis has been depicted in FIG. 2C. As discussed herein, spacing between adjacent chute lumens can be considered to be spacing between a center of each adjacent chute lumen. Chute lumens that are disposed in rows running in the y-direction can have a spacing between adjacent chute lumens that is the same or different as spacing between adjacent chute lumens that are disposed in rows running in the x-direction. In an example, a spacing between the adjacent chute lumens located in the rows running in the x-direction can be less than the spacing associated with the chute lumens in rows running in the y-direction. For instance, the spacing between the adjacent chute lumens in the distal chute portion 130, located in the rows running in the x-direction can be approximately 0.45. In some embodiments, the difference in spacing between the adjacent chute lumens can be a product of the dimensions of a container in which the ammunition is loaded. Differences between the spacing in the x-direction and the y-direction can be seen in FIG. 2C, where sidewall 240-1 is eroded due to a decrease in spacing between the chute lumens disposed in the x-direction, whereas sidewall 240-2 exists between chute lumens disposed in the y-direction.

As discussed, convergence of the chute lumens 150-n can allow for a larger spacing between the sorting lumens 118-n. Spacing between a center of each one of the sorting lumens 118-1, 118-2, 118-n in the sorting tray 104 can be approximately 0.58 inches. In some embodiments, the sorting lumens that are disposed in rows orthogonal to the row in which sorting lumens 118-1, 118-2, 118-n are disposed can have the same or different spacing between each other as the spacing associated with the sorting lumens 118-1, 118-2, 118-n. For clarity, if the row in which the sorting lumens 118-1, 118-2, 118-n are located is considered to be in the y-direction, the sorting lumens that are in rows orthogonal to the y-direction can be considered to be in the x-direction. As discussed herein, spacing between adjacent sorting lumens can be considered to be spacing between a center of each adjacent sorting lumen. Sorting lumens that are disposed in rows running in the y-direction can have a spacing between adjacent sorting lumens that is the same or different as spacing between adjacent sorting lumens that are disposed in rows running in the x-direction. In an example, a spacing between the adjacent sorting lumens located in the rows running in the x-direction can be less than the spacing associated with the sorting lumens in rows running in the y-direction. For instance, the spacing between the adjacent sorting lumens located in the rows running in the x-direction can be approximately 0.557. In some embodiments, the difference in spacing between the adjacent sorting lumens can be a product of the dimensions of a container in which the ammunition is loaded.

In some embodiments, spacing between the center of adjacent sorting lumens can be reduced by approximately 20% with respect to the spacing between adjacent chute lumens. In some embodiments, spacing between the center of adjacent sorting lumens with respect to spacing between the center of chute lumens can be reduced by an amount in a range from 15% to 25%.

In some embodiments, larger spacing between the sorting lumens 118-n can allow for cartridges to more easily fall into each one of the sorting lumens 118-n. For example, as depicted in FIG. 1B, the sorting lumens 118-n are spaced apart by an adequate amount to allow the cartridges 120-3 to fall into each respective sorting lumen 118-n. The closer the sorting lumens 118-n are spaced together, the more difficult it can be for cartridges 120-n to have enough space to tip and fall into each respective sorting lumen 118-n. For example, if the sorting lumens 118-n were spaced apart by a same amount as the distal chute portions 154-n, a user would have a more difficult time trying to cause cartridges 120-n to fall into each sorting lumen 118-n.

With respect to the spacing between the distal chute portion 154-n of each chute lumen, the spacing can allow for cartridges to be loaded into containers with decreased spacing between holes into which cartridges are stored. Accordingly, embodiments of the present disclosure can load containers with cartridges that are associated with an increased efficiency with respect to their size versus capacity, all while maintaining an ease at which each one of the sorting lumens 118-n can be filled with a cartridge 120-n.

Figure 1E:
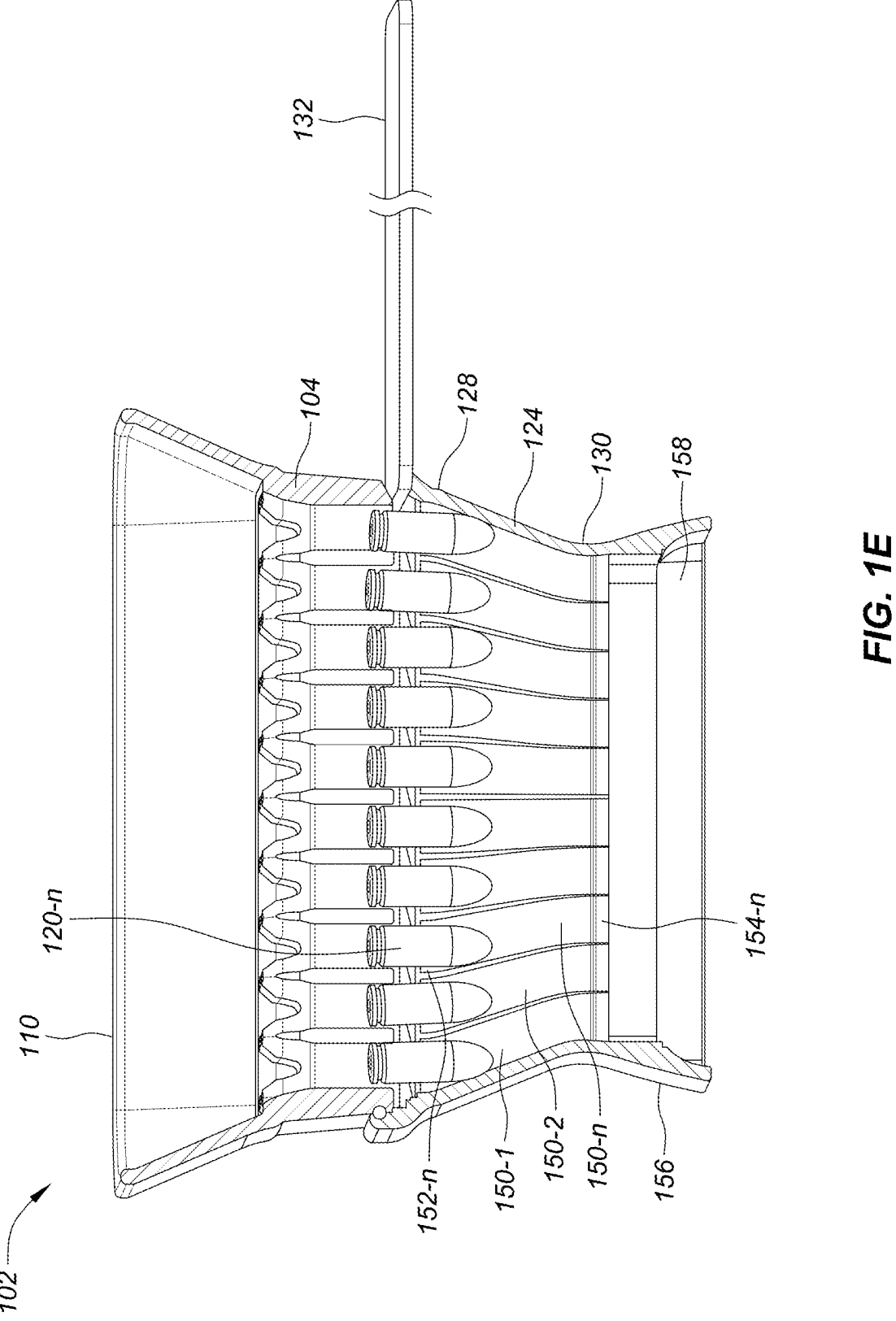
FIG. 1E is the cross-sectional view of the ammunition sorting device depicted in FIG. 1A, along line BB, further depicting protraction of a slide separator and dropping of cartridges into a proximal chute portion of the ammunition sorting device, in accordance with embodiments of the present disclosure.

FIG. 1E is the cross-sectional view of the ammunition sorting device 102 depicted in FIG. 1D, further depicting protraction of a slide separator 132 and dropping of cartridges into a proximal chute portion of the ammunition sorting device, in accordance with embodiments of the present disclosure. As depicted, as the separator 132 is slid out of the ammunition sorting device 102, the cartridges 120-n can begin to drop into the throat portion 152-n of each individual chute lumen 150-n.

Figure 1F:
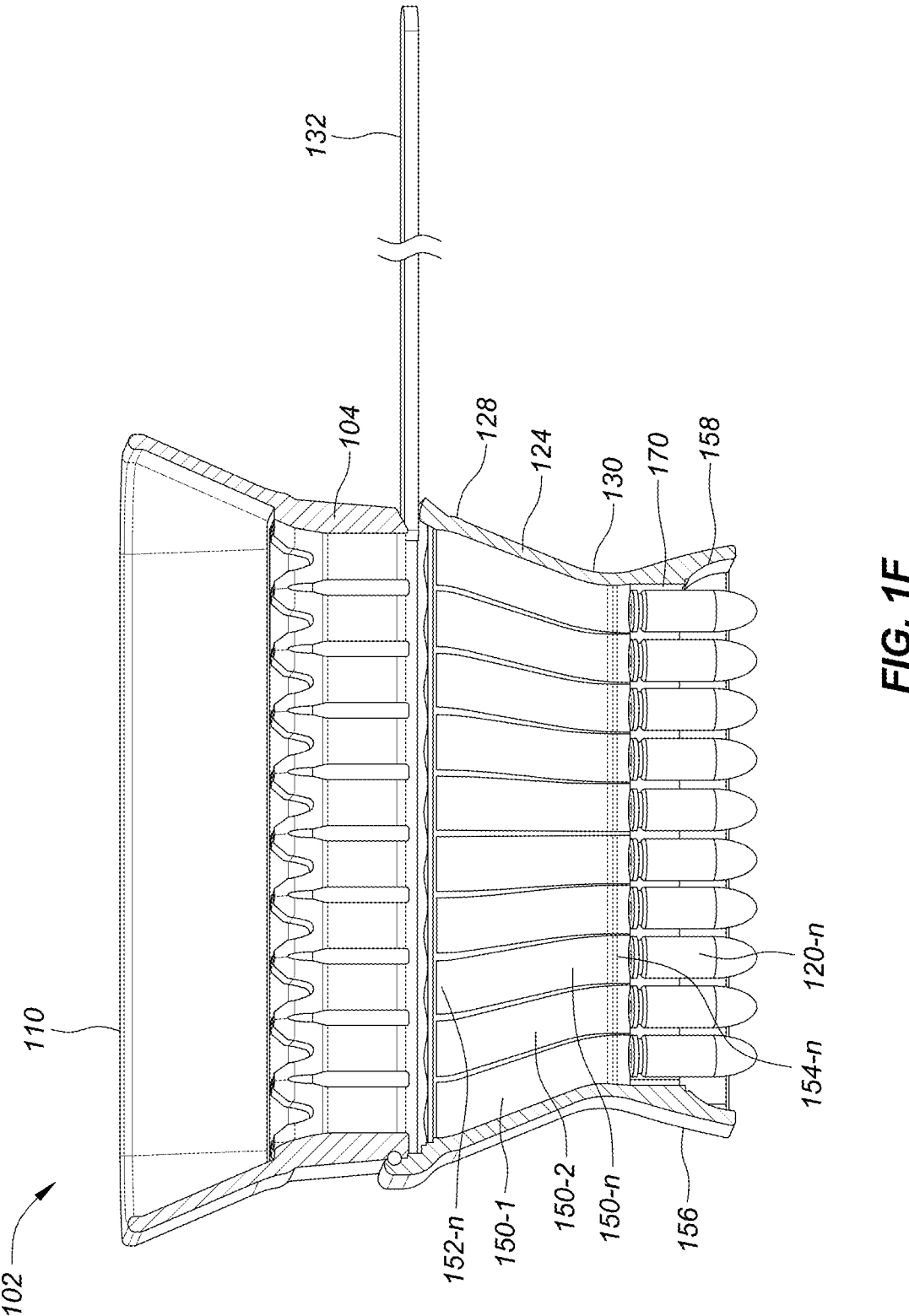
FIG. 1F is a cross-sectional view of the ammunition sorting device depicted in FIG. 1E, further depicting drop-ping of cartridges through a distal chute portion of the ammunition sorting device into a container holder portion, in accordance with embodiments of the present disclosure.

FIG. 1F is a cross-sectional view of the ammunition sorting device 102 depicted in FIG. 1E, further depicting dropping of cartridges 120-n through a distal chute portion 154-n of the ammunition sorting device 102 into a container holder portion 156, in accordance with embodiments of the present disclosure. In some embodiments, the holder portion 156 can define a first recessed area 158 that is configured to guide a container into a second recessed area 170. In some embodiments, the first recessed area 158 can be a widened recessed area that is configured to initially accept a container. For example, a cross-sectional width of the first recessed area 158 can be greater than a cross-sectional width of the container and can further be greater than the second recessed area 170. In some embodiments, a cross-sectional width of the second recessed area 170 can be slightly larger than a container, but smaller than the first recessed area 158. Accordingly, the first recessed area 158 can provide increased ease with which a user can insert a container into the second recessed area 170.

In some embodiments, the container can be retained within the second recessed area 170 via a frictional fit, magnets, or other type of releasable fastener. In some embodiments, the container can be retained within the second recessed area 170 by the user grasping the container and the ammunition sorting device 102, thereby holding the container in a fixed position with respect to the container.

Figure 1G:
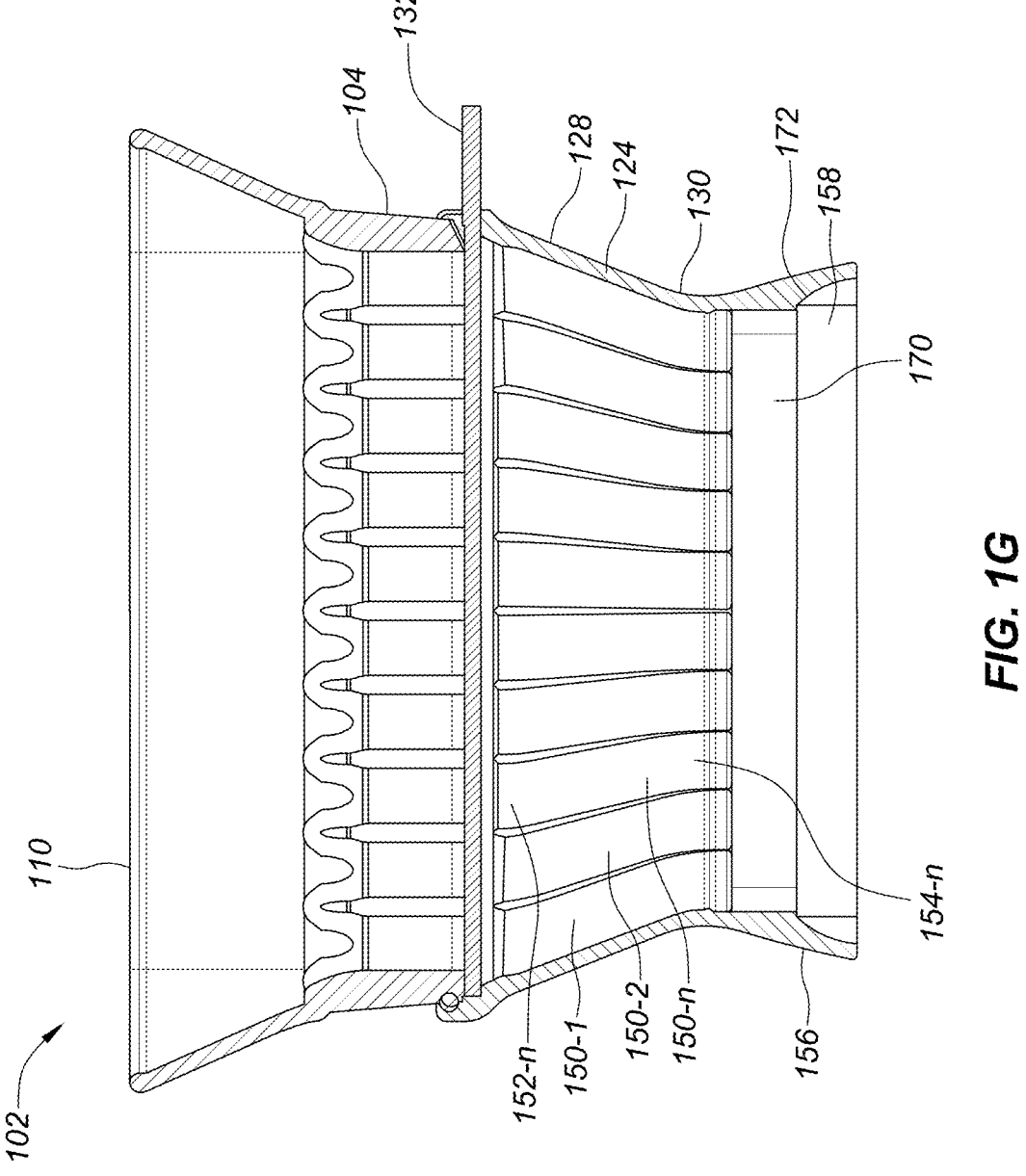
FIG. 1G is a cross-sectional view of the ammunition sorting device depicted in FIG. 1E, where the cartridges have been loaded into a container and are no longer disposed in the ammunition sorting device, in accordance with embodiments of the present disclosure.

FIG. 1G is a cross-sectional view of the ammunition sorting device 102 depicted in FIG. 1E, where the cartridges 120-n have been loaded into a container and are no longer depicted as being disposed in the ammunition sorting device 102, in accordance with embodiments of the present disclosure. The relationship between the first recessed area 158 and the second recessed area 170 is further depicted in FIG. 1G. For example, the first recessed area 158 is defined by a tapered throat 172, which transitions into the second recessed area 170, allowing for smooth feeding of the container into the second recessed area 170.

FIG. 2A depicts an exploded isometric side view of an ammunition sorting device 190, in accordance with embodiments of the present disclosure. The ammunition sorting device 190 can include the same or similar features with respect to those discussed in relation to FIGS. 1A to 1G. As further depicted in FIG. 2A, the ammunition sorting device 190 can include a sorting tray 192. In some embodiments, the sorting tray 192 can include a proximal sorting portion 194 and a distal sorting portion 196. Disposed proximally with respect to the sorting tray 192 is a hopper portion 198, that extends proximally from the sorting tray 192. As discussed in relation to FIG. 1A, the hopper portion 198 can include internal walls 200, which extend proximally and laterally outward from the base distal portion of the hopper to a proximal lip of the hopper 198. Similar to that discussed in relation to FIG. 1A, the hopper 198 can include a recess 202 from which excess ammunition can be poured from the ammunition sorting device 190.

Although mostly obstructed from view, the ammunition sorting device 190 can include sorting lumens 204-n defined within the sorting tray 192. The sorting lumens 204-n can extend between the proximal sorting portion 194 and the distal sorting portion 196 and can each be sized to accommodate one round of ammunition.

As depicted, the ammunition sorting device 190 can include a chute insert 206 and a chute sleeve 208. In some embodiments, the chute insert 206 can define a plurality of chute lumens 211-n, which can be disposed in a pattern of 5x10, which matches a corresponding pattern of the sorting lumens 204-n defined in the sorting tray 192. As depicted in FIG. 2A and further depicted in FIG. 2C, the plurality of chute lumens 211-n can be defined within the chute insert 206 and can converge on one another towards their distal ends, as discussed in relation to FIGS. 1A to 1G.

In some embodiments, the chute insert 206 can be housed in a chute sleeve 208. As depicted, the walls of the chute insert 206 and the walls of the chute sleeve 208 can be tapered and can extend laterally outward from a distal to proximal direction, towards the proximal end of the chute insert and the chute sleeve 208. In some embodiments, the exterior sidewalls of the chute insert 206 can be complimentary with those of the sleeve 208, such that the chute insert 206 nests within the sleeve 208. An adhesive can be used to glue the exterior sidewalls of the chute insert 206 to the inner walls of the sleeve 208, in some embodiments. Alternatively and/or in addition, a ledge can be defined around an inner circumference of the sleeve 208, such that a distal chute portion 214 of the chute insert 206 rests on the ledge. For example, although not depicted, a ledge can be disposed around an interior surface of a distal sleeve portion 212. In some embodiments, a ledge can be disposed around an interior surface of a proximal sleeve portion 210 and a corresponding ledge can be disposed around an exterior surface of a proximal chute portion 216. Accordingly, the corresponding ledges can engage one another, allowing for the ledge disposed around the exterior surface of the proximal chute portion 216 to rest on top of the ledge disposed around the interior surface of the proximal sleeve portion 210.

As further depicted in FIG. 2A, the sleeve 208 can include a proximal lip 218, which extends around a portion of the perimeter of the proximal sleeve portion 210. As depicted, the proximal lip 218 can extend proximally from three sides of the proximal sleeve portion 210, defining a recess 220 on one side of the sleeve 208. In some embodiments, the recess 220 can allow for a separator to slide between through the recess 220, between opposing sides 222-1, 222-2 of the lip portion 218. The separator (not depicted) can be the same or similar to that discussed in relation to FIGS. 1A to 1G. Upon assembly of the sorting tray 192, chute insert 206, sleeve 208, and separator (not depicted), the separator can be retracted across a gap existing between an interface between the distal sorting portion 196 and the proximal chute portion 216, thereby blocking an entrance into each of the chute lumens 211-n from each respective sorting lumen 204-n. Accordingly, a user can ensure that each one of the sorting lumens 204-n is filled with a cartridge and then protract the separator, allowing each one of the cartridges to drop into a respective chute lumen 211-n and thus into a container.

Upon assembly of the sorting tray 192 and hopper 198 with the chute sleeve 208 and chute insert 206, the distal sorting portion 196 can be disposed within interior walls of the proximal lip 218. Thus, in some embodiments, a cross-sectional width of the distal sorting portion 196 can be less than a width between opposing sides 222-1, 222-2 of the lip portion 218. In some embodiments, a frictional fit can exist between the distal sorting portion 196 and the interior walls of the proximal lip 218. In some embodiments, corresponding features can be included on the proximal lip 218 and the distal sorting portion 196, such that the sorting tray 192 and the sleeve 208 can be coupled with one another. For example, as depicted in FIG. 2A, a set of holes 226-1, 226-2 can be defined on the proximal lip 218 and a corresponding set of tabs 228-1, 228-2 can be included on the distal sorting portion 196 (further depicted in FIG. 4). In some embodiments, the tabs 228-1, 228-2, along with the distal sorting portion 196 can be inserted a space existing between the interior walls of the proximal lip 218. The tabs 228-1, 228-2 can include a ramp portion and a locking portion. The ramp portion can include a tapered face on a distal side of the tab, which can help guide the tabs 228-1, 228-2 along an interior wall of the proximal lip 218, until the tab becomes disposed within a respective one of holes 226-1, 226-2. The tab can further include a locking portion on a proximal side of the tab, which locks the tab into the respective one of holes 226-1, 226-2, preventing separation of the sorting tray 192 and sleeve 208. Further depiction of a tab is provided in FIG. 4. Although the proximal lip 218 is depicted as being formed on the sleeve 208, in some embodiments, the lip can be formed on a distal end of the sorting tray 192 and corresponding tabs can be included on the proximal end of the sleeve 208.

FIG. 2B depicts an assembled isometric side view of the ammunition sorting device depicted in FIG. 2A, in accordance with embodiments of the present disclosure. In the assembled state, the sets of holes 226-1, 226-2 can be aligned with the corresponding tabs 228-1, 228-2. As further depicted in FIG. 2B, a gap between the distal sorting portion 196 and the proximal sleeve portion 210 can be defined by the recess 220. As discussed herein, the separator can be disposed within the gap and can be retracted/protracted in order to allow or block cartridges traveling from the sorting lumens 204-n into respective ones of the chute lumens 211-n. The cartridges can fall from the sorting lumens 204-n into respective ones of the chute lumens 211-n upon protraction of the separator (i.e., when the separator is pulled from the gap between the distal sorting portion 196 and the proximal sleeve portion 210, thereby unblocking the path between the sorting lumens 204-n and chute lumens 211-n. Upon falling from the sorting lumens 204-n and through the chute lumens 211-n, the cartridges can fall into a container that is disposed within a holder portion 236, which includes the same or similar features as those discussed with respect to the holder portion 156 referenced and discussed in relation to FIGS. 1D to 1G.

FIG. 2C depicts an isometric side and cut-away view of the chute 206 depicted in FIG. 2A, along line CC, in accordance with embodiments of the present disclosure. As depicted in FIG. 2C, a plurality of chute lumens 211-n can be defined within the chute 206. For example, in addition to chute lumen 211-$n$, cross-sections of chute lumens 221-1, 211-2, . . . , 211-5 are depicted. Proximal portions of chute lumens 211-6, 211-7, . . . , 211-10 are also depicted. As the chute lumens 221-1, 211-2, . . . , 211-10, hereinafter referred to in the plural as chute lumens 211-$n$, extend in the distal direction, a spacing between the chute lumens can decrease, as further discussed herein. For example, a spacing between a proximal end of each chute lumen 211-$n$ with respect to adjacent chute lumens 211-$n$ can decrease as each chute lumen 211-$n$ extends distally. In some embodiments, a spacing between a center of each chute lumen 211-$n$ at their respective distal ends is less than a spacing between a center of each chute lumen 211-$n$ at their respective proximal ends.

To better illustrate the change in spacing between each one of the chute lumens 211-$n$, a depiction of x and y axes has been included in FIG. 2C. As further discussed herein, a spacing between a proximal center of each one of the chute lumens 211-$n$ can be greater than a spacing between a distal center of each one of the chute lumens 211-$n$. For example, as each one of the chute lumens 211-$n$ extends distally from its proximal end, a spacing between a center of each one of the chute lumens 211-$n$ can decrease in the x and y direction with respect to adjacent chute lumens 211-$n$. In a particular example, a spacing between the center of chute lumen 211-2 and chute lumen 211-3 can decrease in the x-direction, from the proximal chute portion 216 to the distal chute portion 214. Further, in some embodiments, a spacing between the center of chute lumen 211-8 and chute lumen 211-3 can decrease in the y-direction, from the proximal chute portion 216 to the distal chute portion 214.

In some embodiments, sidewalls 240-1, 240-2 existing between the distal portion of chute lumen 211-2, distal portion of chute lumen 211-7, and distal portion of chute lumen 211-1 can be non-existent to allow for closer spacing of adjacent cartridges. For example, cartridges that have fallen into distal portions of the chute lumens 211-2, 211-7, and 211-1 can have a decreased spacing with respect to one another, allowing them to be loaded into a more efficiently spaced container, as discussed herein.

Figure 2D:
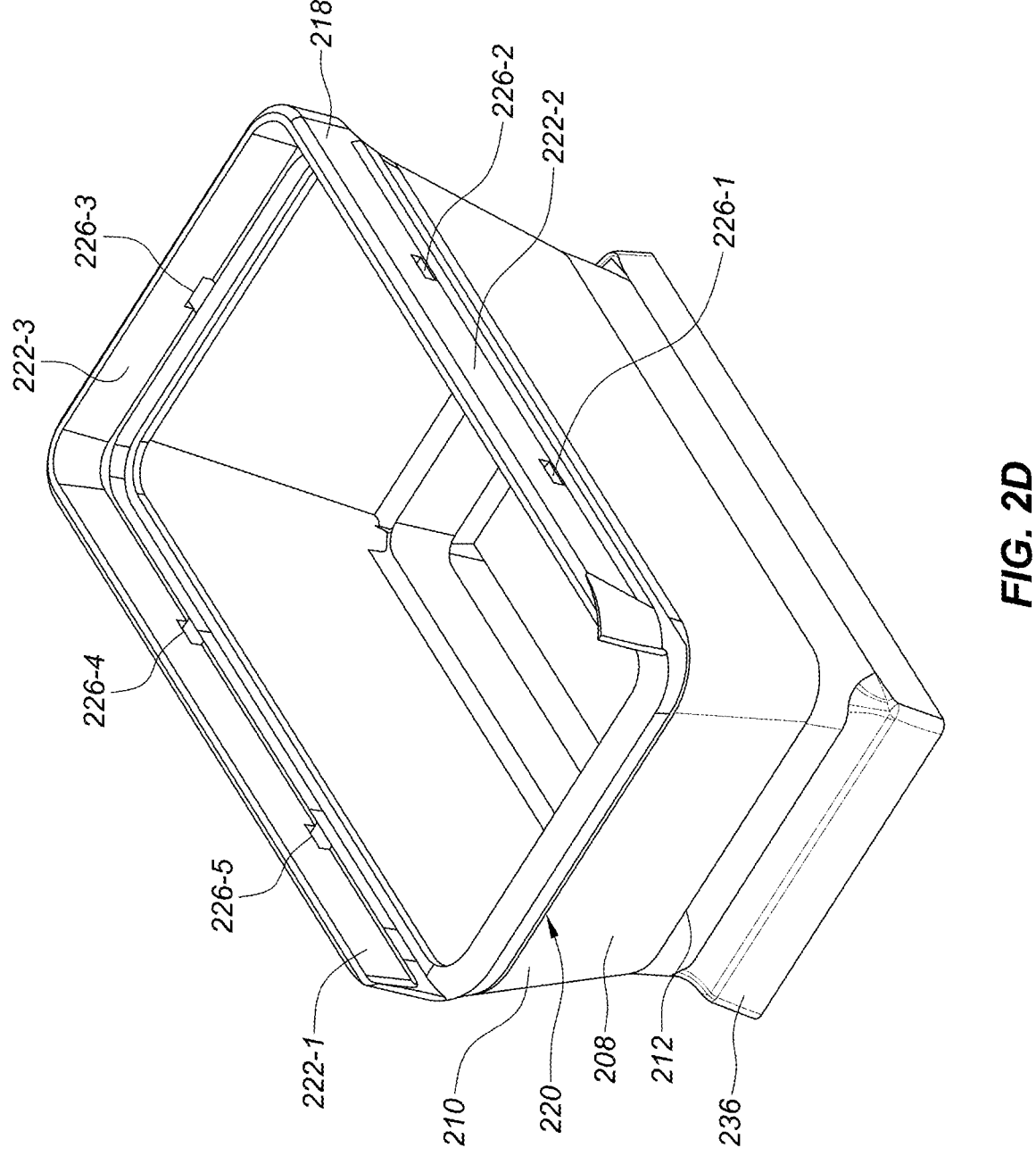
FIG. 2D depicts an isometric top view of a sleeve depicted in FIG. 2A, in accordance with embodiment of the present disclosure.

FIG. 2D depicts an isometric top view of a sleeve 208 depicted in FIG. 2A, in accordance with embodiments of the present disclosure. As discussed herein, the sleeve 208 can include a proximal sleeve portion 210 and a distal sleeve portion 212. FIG. 2D enables an unobstructed view of the set of holes 226-1, 226-2 defined in a first side 222-2 of the lip 218, as well as the opposing sets of holes 226-4, 226-5 defined in the opposing second side 222-1. Furthermore, a hole 226-3 is depicted as being defined in an end side 222-3 that connects the first and second sides 222-1, 222-2 of the lip 218. As discussed herein, the distal sorting tray portion 196 can be contained within the first, second, and end sides 222-1, 222-2, 222-3 of the lip 218 via respective tabs that can be inserted into the holes 226-1 to 226-5.

Figure 3A:
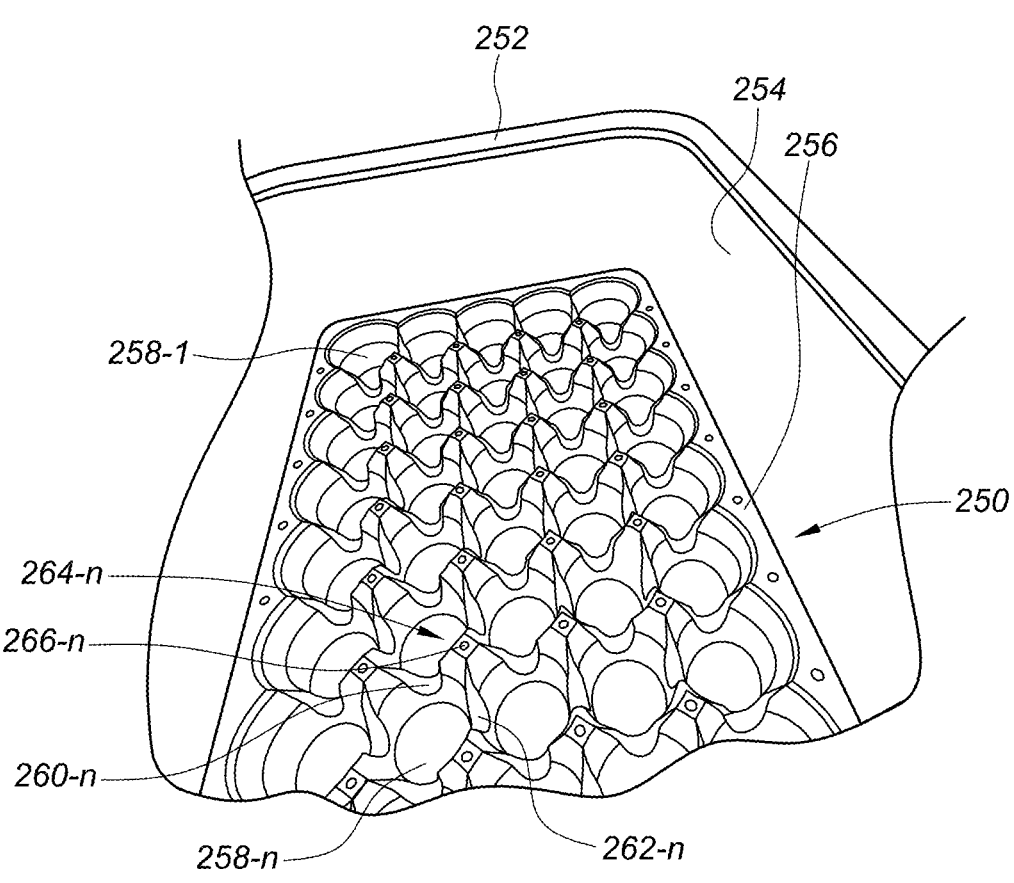
FIG. 3A depicts an isometric top view of a sorting tray with hopper, in accordance with embodiments of the present disclosure.
Figure 3B:
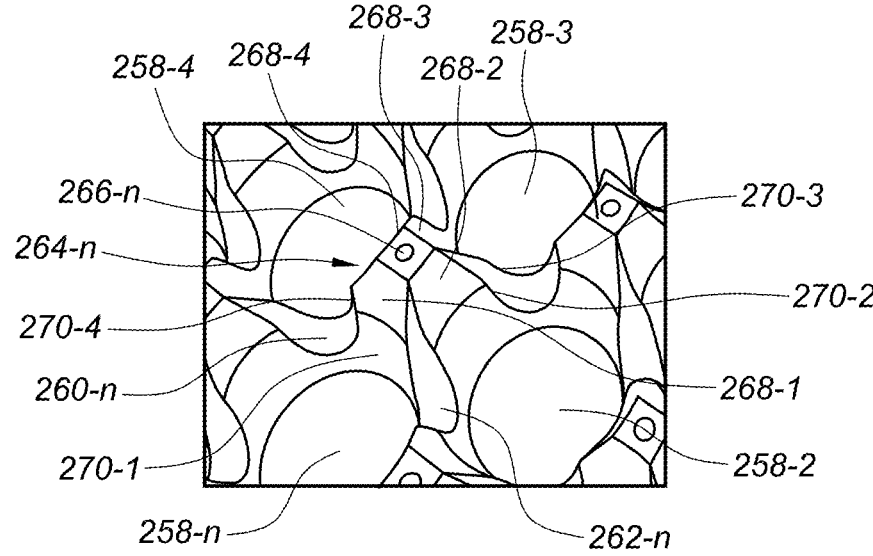
FIG. 3B depicts a blown up image of an alignment projection depicted in FIG. 3A, in accordance with embodiments of the present disclosure.

FIG. 3A depicts an isometric top view of a sorting tray 250 with hopper 252, in accordance with embodiments of the present disclosure. As discussed herein, the hopper 252 can include internal walls 254 that can connect with a proximal sorting portion 256 of the sorting tray 250. A plurality of sorting lumens 258-$n$ can be defined within the sorting tray 250, as depicted. In some embodiments, the sorting tray 250 can include a plurality of sidewalls in an x and y direction. For example, FIG. 3A illustrates a sidewall 260-$n$ running in an x-direction and a sidewall 262-$n$ running in a y-direction. Some of the plurality of sorting lumens 258-$n$ can be defined between the sidewalls 260-$n$, 262-$n$. Others can be defined between one or more sidewalls 260-$n$, 262-$n$ and an outer edge of the sorting tray, such as, for example, sorting lumen 258-1. As depicted in FIG. 3A, in some embodiments, a plurality of alignment projections 264-$n$ can be disposed between intersecting portions of the plurality of sidewalls 260-$n$, 262-$n$. The intersecting portions of the plurality of sidewalls can further define each one of the sorting lumens. In some embodiments, each of the alignment projections 264-$n$ can extend in the proximal direction and can define an apex 266-$n$. In some embodiments, the alignment projections 264-$n$ can be cone shaped, rod shaped, pyramid shaped, etc. As depicted, the alignment projections 264-$n$ are depicted as being pyramid shaped and can include a plurality of lateral faces. In some embodiments, a lateral face can correspond to an adjacent sorting lumen. For example, as depicted in FIG. 3B, the lateral faces 268-1, 270-1 can correspond to the adjacent sorting lumen 258-$n$. As further depicted, the lateral faces 268-2, 270-2 correspond to the adjacent sorting lumen 258-2, the lateral faces 268-3, 270-3 correspond to the adjacent sorting lumen 258-3, and the lateral faces 268-4, 270-4 correspond to the adjacent sorting lumen 258-4. On each side of the alignment projection 264-$n$, two lateral faces 268, 270 are depicted. However, in some embodiments, each side of the alignment projection 264-$n$ can include one lateral face, or more than two lateral faces.

As further depicted in FIG. 3B, each lateral face 268, 270 can define a concave lateral face. Such a lateral face can be defined by an increasing diameter of the sorting lumen in a proximal direction. For example, the concave lateral faces associated with each of the four alignment projections that surround a sorting lumen 258-$n$ can be co-circular with one another. As a result of the co-circular nature of the alignment projections and their associate lateral faces, the curved face of a projectile can be better guided against the concave lateral faces and into each respective sorting lumen.

In some embodiments, and as depicted in FIG. 3A, alignment projections 264-$n$ can be disposed at intersecting portions of the plurality of sidewalls 260-$n$, 262-$n$. For example, an alignment projection 264-$n$ can extend in the proximal direction from the intersecting portions of each of the plurality of sidewalls 260-$n$, 262-$n$. In an example, as depicted in FIG. 3B, four sorting lumens 258-2, 258-3, 258-4, 258-$n$ can be defined in the area surrounding the intersection of sidewalls 260-$n$, 262-$n$ and the alignment projection 264-$n$ can extend in a proximal (e.g., upward) direction, from a region located between the four sorting lumens 258-2, 258-3, 258-4, 258-$n$. Accordingly, the alignment projection 264-$n$ can help to direct and guide ammunition into each respective sorting lumen 258-2, 258-3, 258-4, 258-$n$.

As depicted in FIG. 3A, the sidewalls 260-$n$, 262-$n$ can run in x and y directions, in a grid like fashion, and can be orthogonal to one another. Between the intersection of two adjacent sidewalls running in the x direction (e.g., 260-$n$) and two adjacent sidewalls running in the y direction (e.g., 262-$n$), a sorting lumen 258-$n$ can be defined. Furthermore, four alignment projections 264-$n$ can surround the sorting lumen 258-$n$, in some embodiments, with an alignment projection 264-$n$ formed at each intersection of the two adjacent sidewalls running in the x direction (e.g., 260-$n$) and two adjacent sidewalls running in the y direction (e.g., 262-$n$). In some embodiments, as depicted, each alignment projection 264-$n$ can be disposed between four sorting lumens 258-2, 258-3, 258-4, 258-$n$.

As depicted, the sorting tray 250 extends along a sorting plane, which can be coplanar with the proximal sorting portion 256. With respect to the sorting plan, an angle of each lateral face can decrease in a proximal direction with respect to the sorting plane, in some embodiments, thus defining curved lateral faces in a distal to proximal direction. In some embodiments, each lateral face can include a first lateral face 270-1, 270-2, 270-3, 270-4 and a second lateral face 268-1, 268-2, 268-3, 268-4. As depicted, the first lateral face 270 can be disposed distally with respect to the second lateral face 268. In some embodiments, the first lateral face can be disposed at a first angle with respect to the sorting plane and the second lateral face can be disposed at a second angle with respect to the sorting plane. In some embodiments, the first angle can be greater than the second angle. As a result of the decreased angle of the second lateral face, greater room can be created for the projectile side of a cartridge to rotate down and past the first lateral face and into the sorting lumen 258-n.

Figure 4:
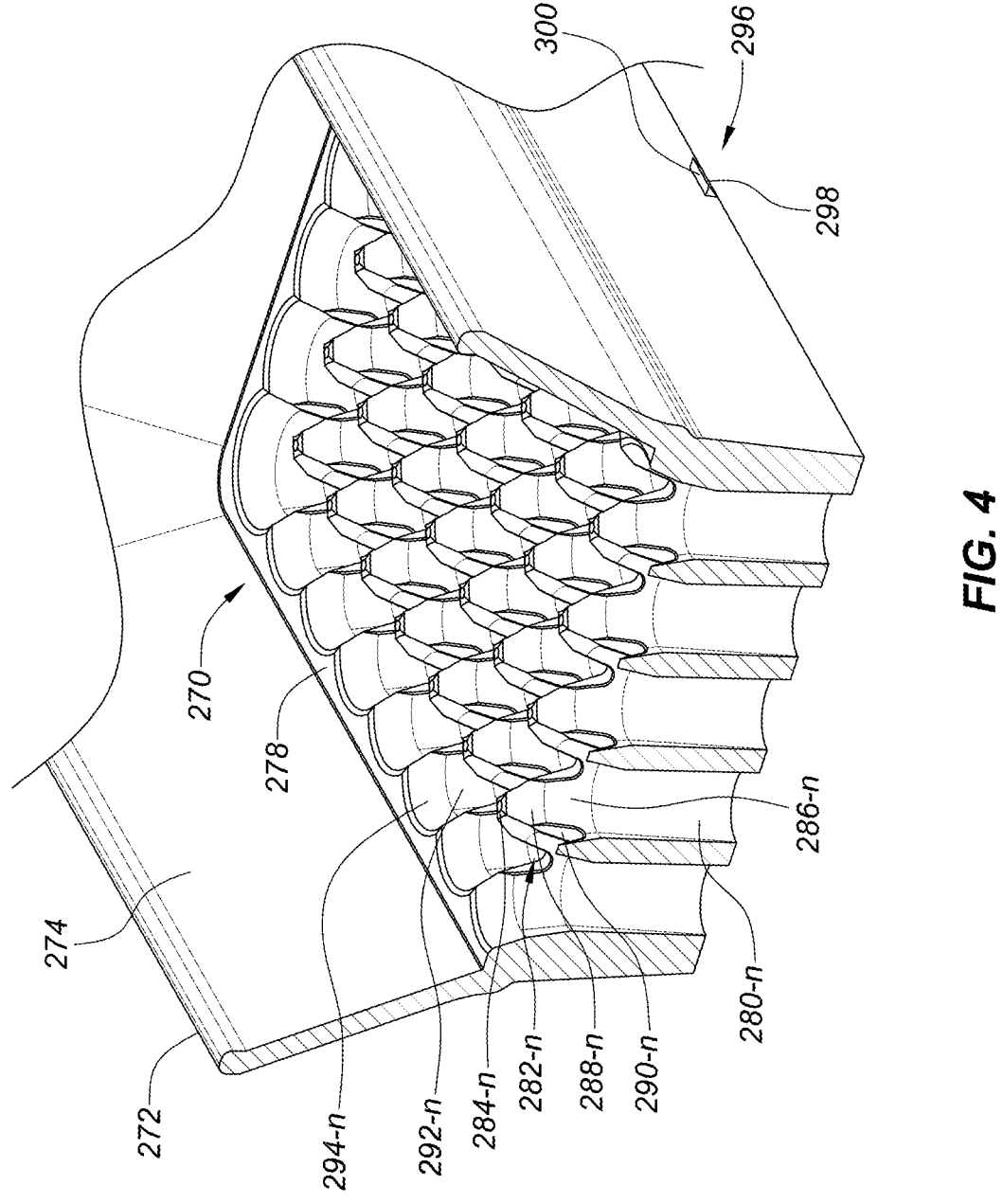
FIG. 4 depicts an isometric top and cut-away view of a sorting tray with hopper, in accordance with embodiments of the present disclosure.

FIG. 4 depicts an isometric top and cut-away view of a sorting tray 270 with hopper 272, in accordance with embodiments of the present disclosure. As previously discussed, the hopper 272 can include an internal wall 274, which can be connected with a sorting tray 270. For example, the internal wall 274 can be connected with a proximal sorting portion 278. In some embodiments, a plurality of sorting lumens 280-n can be defined in the sorting tray 270 and can extend between a proximal portion and distal portion of the sorting tray, as further discussed herein. As depicted, the sorting tray 270 can include an alignment projection 282-n, which can extend proximally from the sorting tray 270. In some embodiments the alignment projection 282-n can include an apex 284-n. The apex 284-n can extend proximally such that it is a same height as the proximal sorting portion 278.

Further depicted in FIG. 4 are lateral faces 286-n, 288-n, as further discussed herein. Lateral faces 286-n, 288-n can include the same or similar features as those discussed in relation to FIGS. 3A and 3B. Also depicted in FIG. 4, is saddle portion 290-n, which can be an area defined between adjacent alignment projections 282-n. In some embodiments, the saddle portion 290-n can be a trough that exists between adjacent alignment projections 282-n. The saddle portion 290-n better allows the projectile end to rotate in a distal direction, between adjacent alignment projections 282-n, thereby allowing the cartridge to rotate and fall into a corresponding sorting lumen 280-n.

As further depicted, sorting lumens that abut a sidewall of the sorting tray 270 can include tapered throat portions. For example, tapered throat portions can be continuously tapered throat portions that extend from proximal ends of the sorting lumen 280-n. In some embodiments, as depicted in FIG. 4, the tapered throat portions can include multiple portions that are tapered at different angles. For example, a first throat portion 292-n can be tapered at a first angle and a second throat portion 294-n can be tapered at a second angle that is a lesser angle with respect to the sorting plane than the first angle. In some embodiments, the angles associated with the first throat portion 292-n and second throat portion 294-n can be the same as those associated with the lateral faces 286-n, 288-n; however, since no adjacent sorting lumen exists between the outer edge of the sorting tray 270 and the lateral faces, no alignment projection is formed. While sorting lumen 280-n also includes a throat portion, the throat portion of sorting lumen associated with first and second throat portions 292-n, 294-n, which abuts the sidewall of the sorting tray 270 is uninterrupted by, for example, a saddle portion 290-n.

As further depicted in relation to FIG. 4, a retention tab 296 is depicted as extending laterally outward from the sorting tray 270. The retention tab 296 can interface with one of holes 226-1, 226-2, as further depicted and discussed in relation to FIGS. 2A, 2B, and 2D. The retention tab 296 can include a ramp portion 298 and a locking portion 300. The ramp portion 298 can include a tapered face on a distal side of the retention tab 296, which can help guide the retention tab along an interior wall of a proximal lip 218, until the retention tab becomes disposed within a respective one of holes 226-1, 226-2 (see FIGS. 2A, 2B, 2D). For example, in some embodiments, the sorting tray 270 and/or the respective sleeve into which the sorting tray 270 is inserted can be formed from a polymer (e.g., plastic), which can deflect as the sorting tray 270 is inserted into the proximal lip 218 by virtue of the ramp portion 298 deflecting the lip portion 218. The retention tab 296 can further include a locking portion on a proximal side of the tab, which locks the tab into the respective one of holes 226-1, 226-2, preventing separation of the sorting tray 270 and sleeve. For instance, when the retention tab 296 becomes inserted into the respective one of holes 226-1, 226-2, the proximal lip 218 can snap back into its undeflected state.

Embodiments are described herein of various apparatuses, systems, and/or methods. Numerous specific details are set forth to provide a thorough understanding of the overall structure, function, manufacture, and use of the embodiments as described in the specification and depicted in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It will be appreciated that the terms "proximal" and "distal" may be used throughout the specification with reference to a clinician manipulating one end of an instrument used to treat a patient. The term "proximal" refers to the portion of the instrument closest to the clinician and the term "distal" refers to the portion located furthest from the user. It will be further appreciated that for conciseness and clarity, spatial terms such as "vertical," "horizontal," "up," and "down" may be used herein with respect to the illustrated embodiments. However, embodiments of the present disclosure may be used in many orientations and positions, and these terms are not intended to be limiting and absolute.

Although at least one embodiment for an ammunition sorting device has been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. Joinder references (e.g., affixed, attached, coupled, connected, and the like) are to be construed broadly and can include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting. Changes in detail or structure can be made without departing from the spirit of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed:

1. An ammunition sorting device, comprising:
a sorting tray, the sorting tray including a proximal sorting portion and a distal sorting portion, wherein a plurality of sorting lumens are defined within the sorting tray, and wherein each of the plurality of sorting lumens extends between the proximal sorting portion and the distal sorting portion of the sorting tray, wherein the sorting tray further comprises:
   a plurality of sidewalls aligned in an x and y direction, wherein the plurality of sorting lumens are defined between intersecting portions of the plurality of sidewalls,
   a plurality of alignment projections disposed at intersecting portions of the plurality of sidewalls, wherein:
      each of the alignment projections extends in the proximal direction and defines an apex,
      each of the plurality of alignment projections defines a plurality of lateral faces, each lateral face corresponding to an adjacent one of the sorting lumens,
      each lateral face includes a first lateral face and a second lateral face,
      the first lateral face is disposed distally with respect to the second lateral face, the first lateral face is disposed at a first angle with respect to the sorting plane and the second lateral face is disposed at a second angle with respect to the sorting plane, and
      the first angle is greater than the second angle;
a chute disposed adjacent the distal sorting portion of the sorting tray, the chute including a proximal chute portion and a distal chute portion, wherein the chute defines a plurality of chute lumens corresponding to each of the plurality of sorting lumens and extending between the proximal chute portion and the distal chute portion.

2. The ammunition sorting device of claim 1, wherein each of the plurality of sorting lumens extends about a plurality of respective sorting axes.

3. The ammunition sorting device of claim 2, wherein each of the plurality of sorting axes are parallel with one another.

4. The ammunition sorting device of claim 3, wherein each of the plurality of chute lumens extend about a plurality of respective chute axes.

5. The ammunition sorting device of claim 4, wherein each of the plurality of chute lumens converge towards one another in a direction from the proximal chute portion to the distal chute portion.

6. The ammunition sorting device of claim 4, wherein a distance between a center of each one of the chute lumens and a center of each adjacent chute lumen decreases in a direction from the proximal chute portion to the distal chute portion.

7. The ammunition sorting device of claim 1, wherein a diameter of each sorting lumen increases at a proximal end thereof.

8. The ammunition sorting device of claim 1, wherein each lateral face defines a concave lateral face.

9. The ammunition sorting device of claim 1, wherein the sorting tray extends along a sorting plane and an angle of each lateral face decreases in the proximal direction with respect to the sorting plane.

10. An ammunition sorting device, comprising:
a sorting tray, the sorting tray including a proximal sorting portion and a distal sorting portion, wherein a plurality of sorting lumens are defined within the sorting tray, and wherein each of the plurality of sorting lumens extends between the proximal sorting portion and the distal sorting portion of the sorting tray;
a chute disposed adjacent the distal sorting portion of the sorting tray, the chute including a proximal chute portion and a distal chute portion, wherein the chute defines a plurality of chute lumens corresponding to each of the plurality of sorting lumens and extending between the proximal chute portion and the distal chute portion;
a chute sleeve attached to the distal sorting portion of the sorting tray, wherein the chute sleeve houses the chute; and
a slide separator disposed between the sorting tray and the chute, wherein the slide separator is configured to be protracted, thereby allowing ammunition present in the sorting tray to fall into the chute.

11. The ammunition sorting device of claim 10, wherein the plurality of sorting lumens define a plurality of parallel sorting axes.

12. The ammunition sorting device of claim 11, wherein the plurality of chute lumens define a plurality of converging chute axes.

13. An ammunition sorting device, comprising:

a sorting tray, the sorting tray including a proximal sorting portion and a distal sorting portion, wherein a plurality of sorting lumens are defined within the sorting tray, and wherein each of the plurality of sorting lumens extends between the proximal sorting portion and the distal sorting portion of the sorting tray;

a plurality of alignment projections disposed between the plurality of sorting lumens, wherein each of the plurality of alignment projections extends in a proximal direction; and a chute disposed adjacent the distal sorting portion of the sorting tray, the chute including a proximal chute portion and a distal chute portion, wherein the chute defines a plurality of chute lumens corresponding to each of the plurality of sorting lumens and extending between the proximal chute portion and the distal chute portion; and a slide separator disposed between the sorting tray and the chute, wherein the slide separator is configured to be protracted, thereby allowing ammunition present in the sorting tray to fall into the chute.

14. The ammunition sorting device of claim 13, wherein the sorting tray includes a plurality of sidewalls, wherein the plurality of sorting lumens are defined between an intersection of the plurality of sidewalls.

15. The ammunition sorting device of claim 14, wherein the alignment projections are disposed at the intersection of the plurality of sidewalls.

16. The ammunition sorting device of claim 15, wherein each alignment projection is disposed between four sorting lumens.

* * * * *